United States Patent
Chang

(10) Patent No.: US 7,150,076 B2
(45) Date of Patent: Dec. 19, 2006

(54) HANDLEBAR FIXING DEVICE

(75) Inventor: Ferretti Chang, Taipei (TW)

(73) Assignee: Chien Ti Enterprise Co., Ltd., Taipei (TW)

( * ) Notice: Subject to any disclaimer, the term of this patent is extended or adjusted under 35 U.S.C. 154(b) by 127 days.

(21) Appl. No.: 10/960,912

(22) Filed: Oct. 12, 2004

(65) Prior Publication Data

US 2006/0075604 A1 Apr. 13, 2006

(51) Int. Cl.
*A45C 13/22* (2006.01)

(52) U.S. Cl. ............... 16/421; 16/900; 16/438; 74/551.3

(58) Field of Classification Search .......... 16/421, 16/900, 436, 438, 444–446; 74/551.5, 551.3, 74/551.6, 551.7; 403/110, 109.7; 280/47.315, 280/47.371, 491.2, 655, 655.1
See application file for complete search history.

(56) References Cited

U.S. PATENT DOCUMENTS

| 1,413,463 | A | * | 4/1922 | Filor | 403/93 |
|---|---|---|---|---|---|
| 2,414,275 | A | * | 1/1947 | Schwinn | 74/551.4 |
| 4,437,621 | A | * | 3/1984 | Sakumoto | 242/284 |
| 4,444,091 | A | * | 4/1984 | Jorgensen, Jr. | 91/427 |
| 4,732,403 | A | * | 3/1988 | Grattapaglia | 280/278 |
| 5,069,421 | A | * | 12/1991 | Kishi et al. | 251/99 |
| 5,241,881 | A | * | 9/1993 | Chen | 74/551.2 |
| 5,269,044 | A | * | 12/1993 | Marion | 16/438 |
| 5,301,570 | A | * | 4/1994 | Li | 74/551.1 |
| 5,443,570 | A | * | 8/1995 | Hirano | 242/284 |
| 5,456,135 | A | * | 10/1995 | Li | 74/551.7 |
| 5,765,771 | A | * | 6/1998 | Yamaguchi et al. | 242/284 |
| 5,819,581 | A | * | 10/1998 | Winton, III | 72/458 |
| 5,887,490 | A | * | 3/1999 | Dittmar | 74/551.3 |
| 5,906,452 | A | * | 5/1999 | Lee | 403/325 |
| 6,581,492 | B1 | * | 6/2003 | Chen | 74/551.3 |
| 6,941,835 | B1 | * | 9/2005 | Ying | 74/551.3 |
| 6,973,853 | B1 | * | 12/2005 | Chang | 74/551.3 |

FOREIGN PATENT DOCUMENTS

| FR | 2736032 A1 | * | 1/1997 |
|---|---|---|---|
| JP | 2000159167 A | * | 6/2000 |
| JP | 2002037171 A | * | 2/2002 |
| JP | 2004034845 A | * | 2/2004 |

* cited by examiner

*Primary Examiner*—Chuck Y. Mah

(57) ABSTRACT

A handlebar fixing device of a motorized cart including a head tube formed on the upper section and a seat formed on the lower section, a connection tube formed with a shifter structure, a handlebar having a fan-shaped connection plate formed on the lower section with holes, a holder formed above the seat of the head tube, a spring formed inside the hollow of the holder, and a rod having a section extending inside the spring, a stopper formed on the lateral, and a bolt hole formed on the lower section connecting to the base of the connection tube.

By pressing down the handlebar, the stopper presses the rod down to the head tube, restraining the handlebar from moving right or left. With the stopper pressing the rod and a locking rod of the shifter structure being pushed, the handlebar being prevented from moving up or down.

1 Claim, 4 Drawing Sheets

HANDLEBAR FIXING DEVICE

BACKGROUND OF THE INVENTION (a) Field of the Invention

The present invention relates to a handlebar fixing device of a motorized cart and more particularly to a shifter being able to be shifted quickly to fix a handlebar.

(b) Description of the Prior Art

A conventional way to fix a folded handlebar of a motorized cart in position is usually designed aiming only at facilitating packaging or storing either by using a rope or a tape to fasten the handlebar on the cart frame or by forming a joint enabling the handlebar to fold and hook to the frame thereof. Although conventional ways work well, deficiencies of unstable fixing effect can be happened.

SUMMARY OF THE INVENTION

The present invention relates a handlebar fixing device of a motorized cart including a head tube, a connection tube, a handlebar, a holder, a spring, and a rod.

By pressing down the handlebar, a stopper thereof on the lateral will press the rod down to a groove of the head tube, thereby restraining the handlebar from moving right or left. With the stopper pressing tightly the rod and also a locking rod of a shifter structure of the connection tube being pushed to the lateral of the handlebar by a shifter of the shifter structure, thereby prevents the handlebar from moving up or down.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
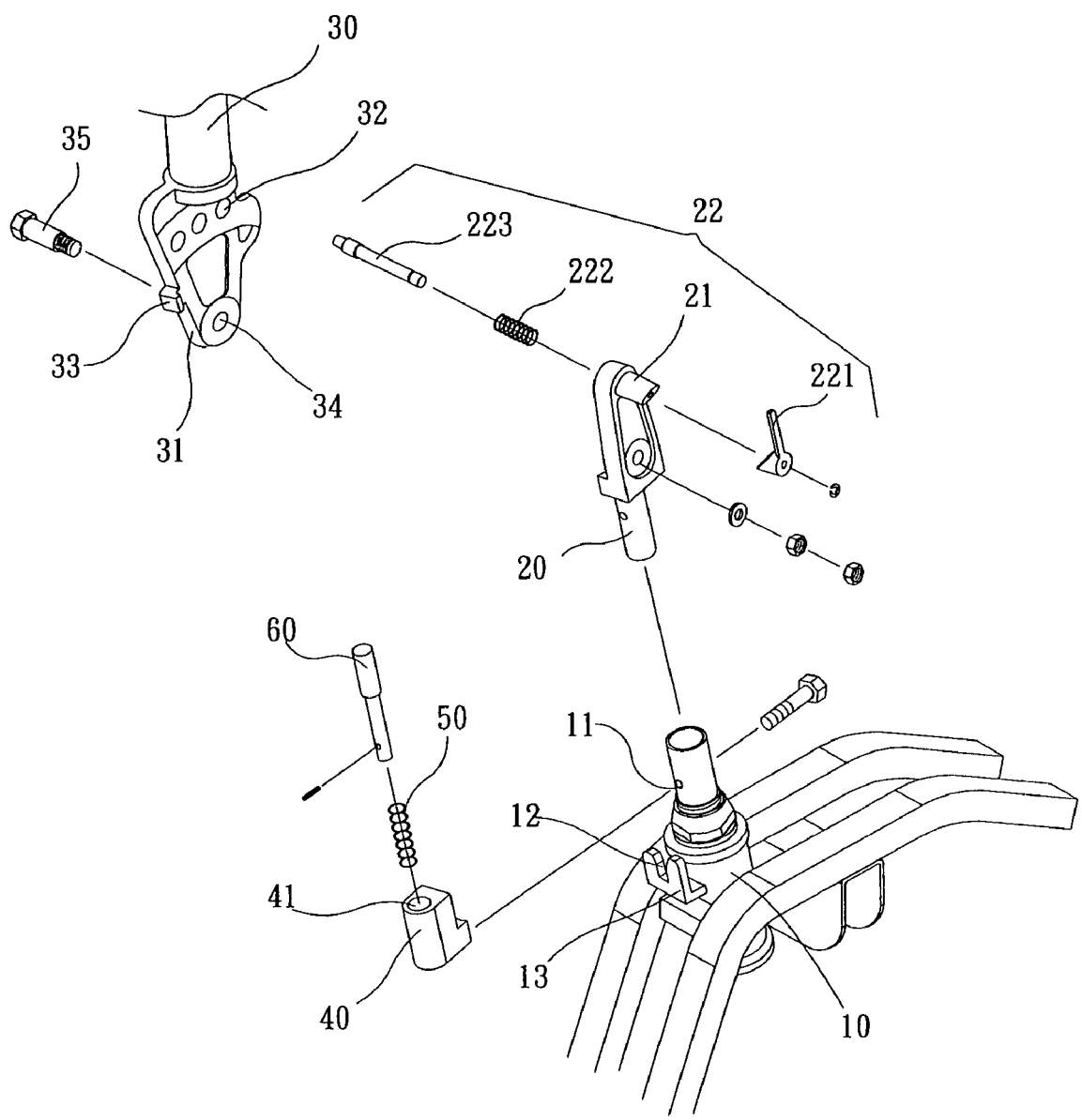
FIG. 1 shows an exploded elevational view of the present invention.
Figure 2:
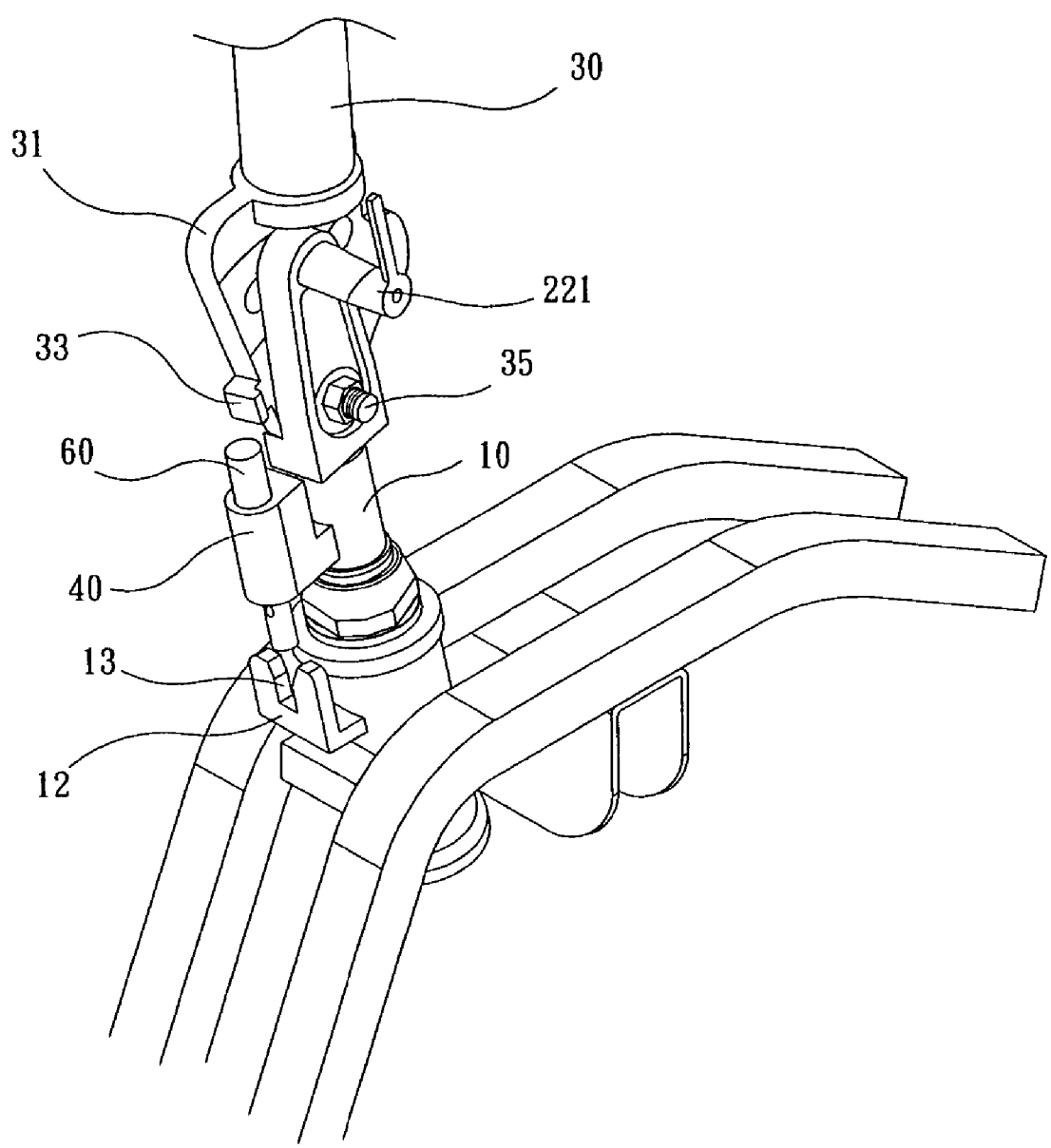
FIG. 2 shows a perspective view of the present invention.

Referring to FIGS. 1 and 2 The present invention relates to a handlebar fixing device of a motorized cart including a head tube 10, a connection tube 20, a handlebar 30, a holder 40, a spring 50, and a rod 60, wherein the head tube 10 having a hole 11 formed on the upper section and a L-shaped seat 12 with a groove 13 formed on the lower section;

the connection tube 20, for connecting to the head tube 10, having a base 21 formed on the top, wherein a shifter 221, a spring 222, and a locking rod 223 formed a shifter structure 22; wherein, the locking rod 223 is flexibly connected to the handlebar 30, and the handlebar 30 having a fan-shaped connection plate 31 formed on the lower section, wherein holes 32 formed thereon, a stopper 33 formed on the lateral and a bolting hole 34 for connecting to the base 21 of the connection tube 20 through a bolt 35 formed on the lower section;

the holder 40 being formed above the seat 12 of the head tube 10 and having a hollow 41 formed in vertical direction;

the spring 50 being formed in the hollow 41 of the holder 40;

the rod 60 having a section extending inside the spring 50 and a section outside thereof.

Figure 3:
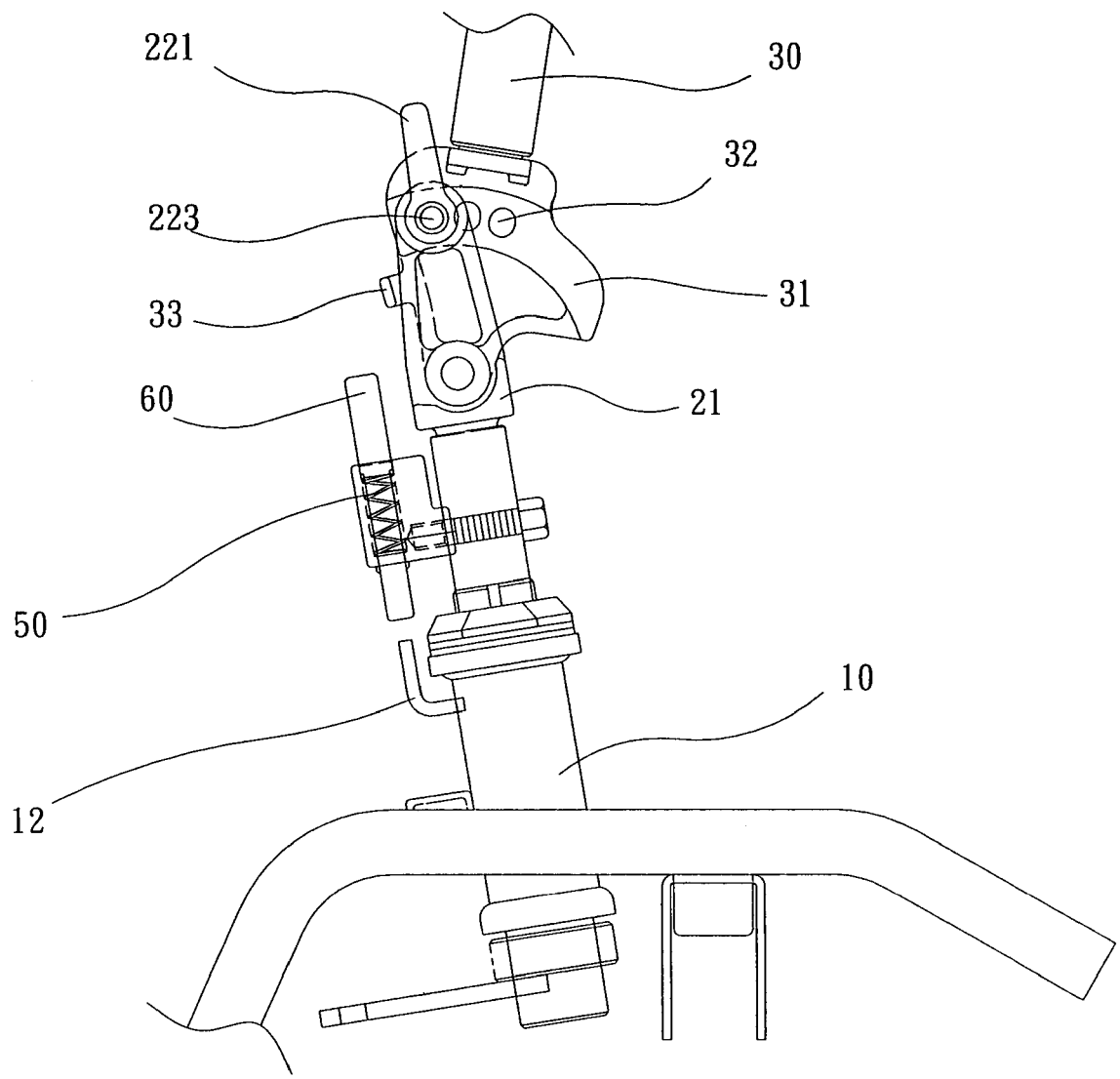
FIG. 3 shows a perspective view of the present invention with a handlebar in an unlocked position.
Figure 4:
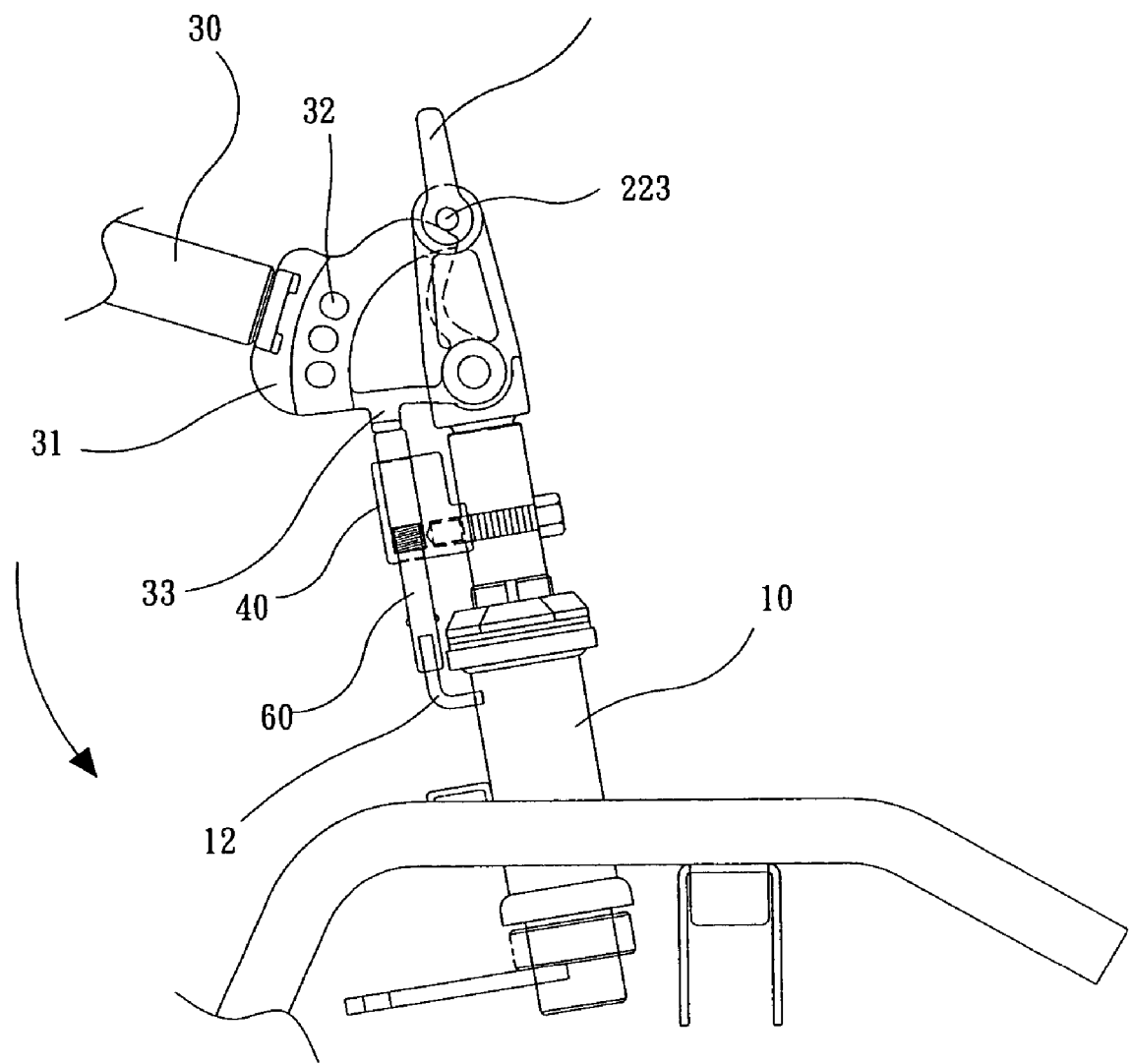
FIG. 4 shows a perspective view of the present invention with the handlebar in locking action.

Refining to FIG. 3. The shifter 221 of the shifter structure 22 connects to the locking rod 223 and further to the hole 32 of the handlebar 30, thereby fixing the handlebar 30 firmly in position, wherein the rod 60 being in a un-pressed natural position. Referring to FIG. 4. By pressing down the handlebar 30 in a direction shown, the stopper 33 on the lateral of the connection plate 31 will then press the rod 60 down to the groove 13 of the bead tube 104 thereby restraining the handlebar 30 moving right or left from the initial position thereof. With the stopper 33 on the lateral of the connection plate 31 pressing tightly the rod 60 and the locking rod 223 of the shifter structure 22 being pushed out from the initial position to the lateral of the handlebar 30 by the shifter 221 of the shifter structure 22, the handlebar 30 thereby being restrained from moving up or down.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A handlebar fixing device of a motorized cart comprising a head tube, a connection tube, a handlebar, a holder, a spring, and a rod, wherein the head tube having a hole formed on the upper section and a seat formed on the lower section;

the connection tube having a base formed on the top, wherein a shifter structure formed thereon;

the shifter structure having a shifter and a locking rod flexibly connected to the handlebar;

the handlebar having a fan-shaped connection plate formed on the lower section, wherein holes formed thereon, a stopper formed on the lateral and a bolting hole, connecting to the base of the connection tube through a bolt, formed on the lower section;

the holder being formed above the seat corresponding to the head tube and having a hollow formed in vertical direction;

the spring being formed in the hollow of the holder;

the rod having a section extending inside the spring and a section outside thereof; by pressing down the handlebar with the locking rod flexibly connected thereof, the stopper will then press the rod down to a groove of the seat of the head tube, thereby restraining the handlebar moving right or left from an initial position thereof; with the stopper pressing tightly the rod thereby enabling the locking rod being pushed out by the shifter of the shifter structure to the lateral of the handlebar from an initial position thereof, preventing the handlebar from moving up or down.

* * * * *